UNITED STATES PATENT OFFICE.

GILMAN B. GARLAND, OF GARDINER, MAINE.

IMPROVED COMPOSITION FOR MANUFACTURE OF SCHOOL-SLATES.

Specification forming part of Letters Patent No. 96,688, dated November 9, 1869.

*To all whom it may concern:*

Be it known that I, GILMAN B. GARLAND, of Gardiner, in the county of Kennebec, and State of Maine, have invented a new and useful improved chemical compound or composition for slating wood, pasteboard, felting, or other suitable substances, for the use of schools, or roofing, flooring, paving, and for various other desirable purposes for which it may be adapted; and I do hereby declare that the following is a full and exact description or direction for preparing and applying the same to practical use, and what I claim as my invention, and desire to secure Letters Patent for.

First, I use six different ingredients, viz., ground plaster, black-walnut stain, benzine, gum-shellac, white vitriol, and ivory-black, in the proportion, or nearly so, of three pounds of ground plaster to one quart of black-walnut stain, one quart of benzine, one pint of gum-shellac, one pint of white vitriol, dissolved, and one pound of ivory-black, the whole, when thoroughly mixed, making about one gallon of the preparation or slating, which is then applied with a brush.

Claim.

I claim applying the within-described composition for slating, in the manner and about in the proportions herein specified, for the purposes set forth.

GILMAN B. GARLAND.

Witnesses:
JOSIAH MAXEY,
CYRUS LIBBY.